Patented May 2, 1933

1,906,236

UNITED STATES PATENT OFFICE

GEORGE PHILO PITKIN, OF BERGENFIELD, NEW JERSEY, AND CHARLES WARREN HOOPER, OF SHARON, CONNECTICUT, ASSIGNORS TO H. A. METZ LABORATORIES, INC., OF NEW YORK, N. Y., A CORPORATION OF NEW YORK

REENFORCED, STABLE, AND STERILE AQUEOUS PROTEIN PREPARATIONS

No Drawing. Application filed May 12, 1931. Serial No. 536,936.

Our invention relates to improvements in protein solutions useful in non-specific therapy and methods of preparing the same, and more particularly to protein solutions reenforced with an ipecac alkaloid or alkaloids. According to our invention in its preferred form a reenforced protein solution is obtained which is not only stable and sterile but has a great usefulness in non-specific therapy and especially in the parenteral treatment of peptic ulcer.

Parenteral administration of various proteins commonly employed in non-specific therapy, especially of those contained in milk and blood, various vaccines, mixed vaccines, compound mixed vaccines, such as Much's antigen, bacterial extracts and autolysates and tissue extracts and autolysates, temporarily stimulates the vegetative nerves and produces hypoperistalsis of the stomach, lessens the amount of free hydrochloric acid, induces hyperemia and increases vascularity in the gastric mucosa as well as augments the production of gastric enzymes and total fluids. Such solutions administered parenterally have been tested out therapeutically in the treatment of peptic ulcer, to control the gastric functions and check the hypermotility of the stomach, with little or no success because the physiologic functions of the stomach are controlled for too short a period, usually for only 1½ to 2 hours. Moreover, the injection of some of the protein solutions employed in non-specific protein therapy produces a severe general reaction on the part of the patient, such as chills, fever, rigor and occasionally vomiting, which may be detrimental to the patient because the temporary control of the gastric functions is often followed by a marked hypermotility of the stomach.

Ipecac and its alkaloids are very useful therapeutically when employed as emetics and in the treatment of intestinal amebiasis. The ipecac alkaloids, especially emetine and cephaeline, administered parenterally or orally, irritate the stomach, increase its contractions and if administered in adequate doses produce nausea and emesis.

We have found that by reenforcing protein solutions with the ipecac alkaloids, especially emetine and cephaeline, a synergistic solution is created, which does not irritate the stomach and which is capable of controlling gastric functions for a period of 96 to 120 hours with one intravenous injection. The reenforced solution has also a cumulative action so that after the fifth or sixth injection hypoperistalsis, increased vascularity, muscular relaxation and dilation of the stomach are maintained for a period of more than 240 hours. There is also an increased flow of gastric juice containing an adequate supply of enzymes. These phenomena induced in a patient suffering from peptic ulcer relieve the concomitant pain and discomfort and promote healing of the ulcer. The ipecac alkaloids, emetine and cephaeline, in themselves powerful irritants which produce hyperperistalsis, nausea and emesis, act synergistically with respect to the protein, prolonging greatly its therapeutic action in the control of gastric functions. The reenforced solution also increases the resistance of the tissues about the ulcer and exerts an antibacterial action on the causative micro-organisms.

Our early experiments were accompanied by such severe reactions that the patients registered severe complaints, the principal one being a severe rigor lasting from 2 to 6 hours. Some of the proteins injected were obtained from vaccines made from cultures of streptococci isolated directly from peptic ulcers, and later from antogenous serums, none of which could be so developed that they would not produce the anaphylactic symptoms, chill, perspiration, nausea and vomiting in greater or lesser severity, unless given in such minute doses that they were of no therapeutic value.

Our animal experiments demonstrated that we could control the gastric functions without causing protein shock. Certain non-specific proteins, such as the proteins contained in bacteria-fat- and casein-free milk and Much's antigen, were found which caused little or no anaphylactic reaction, although experimentally and clinically the desired results were obtained. By combining these non-specific proteins with an ipecac alkaloid we were enabled to control and prolong the elective action on the stomach so that it persisted for many hours. The reenforced protein solution has been successfully employed in the treatment of 127 patients suffering from peptic ulcer. The results obtained were checked with the X-ray, intragastric photographs, kymograph and gastric analyses and in many of the cases we have X-ray prints and intragastric photographs of the peptic ulcer before and after treatment which show healing.

In producing the reenforced protein solution the proportions may be greatly varied according to the conditions to be met, etc., but we prefer solutions in which the dose of emetine hydrochloride varies from 20 milligrams to 65 milligrams and the dose of Much's antigen solution varies from 2 cubic centimeters to 4 cubic centimeters or in the case of the bacteria- fat- and casein-free milk the dose varies from 5 cubic centimeters to 20 cubic centimeters.

When Much's antigen is used as the protein, good results have been obtained with solutions prepared as follows:

(1.) Emetine hydrochloride 1 gram, Much's antigen 67 cubic centimeters, and 33 cubic centimeters of distilled water.

The parenteral dose of this solution averages about 6 cubic centimeters.

(2.) Emetine hydrochloride 0.333 grams, Much's antigen 33 cubic centimeters and distilled water 67 cubic centimeters.

The term "Much's antigen solution" in the appended claims is to designate a compound mixed vaccine solution containing protein substances obtained from non-pathogenic bacteria (sarcina and B. mycoides), various animal fats and lipoids derived from bile.

The ingredients of the solutions containing Much's antigen are preferably combined by dissolving the emetine hydrochloride in the described amount of distilled water and mixing the solution with the described amount of Much's antigen.

In order to prevent infection at the site of injection it is essential that the solutions be sterile. We have found that sterility may be insured by filling glass ampules to the desired volume with the freshly prepared solution, then promptly sealing off the ampules with the aid of a blow-pipe and then submerging the ampules for thirty minutes in water held at a temperature of 80 degrees centigrade. This procedure has been found most practical because it prevents loss by evaporation and contamination after sterilization.

When bacteria- fat- and casein-free milk is employed as the protein good results have been obtained with solutions prepared as follows:

(1.) Emetine hydrochloride 0.100 grams dissolved in 100 cubic centimeters of bacteria- fat- and casein-free milk.

The average parenteral dose of this solution is 20 cubic centimeters.

(2.) Emetine hydrochloride 1.3 grams dissolved in 100 cubic centimeters of bacteria- fat- and casein-free milk.

An average parenteral dose of this solution is 5 cubic centimeters.

The bacteria- fat- and casein-free milk may be prepared in the following manner:

The milk is obtained from the animal under aseptic conditions. It is freed of fat in a sterile milk separator and then filtered by means of a berkefelt filter, in order to free it of casein and any bacteria, directly into a sterile container. The described amount of emetine hydrochloride is then added and dissolved under aseptic conditions.

In order to insure sterility sterile glass ampules are filled to the desired volume with the fresh sterile bacteria- fat- and casein-free milk-emetine hydrochloride solution, then promptly sealing off the ampules with the aid of a blow-pipe.

We have thoroughly tested out the above reenforced protein solutions for sterility and stability. Relatively old solutions thereof have shown no change in physical or chemical characteristics and have retained their full therapeutic potency. Thus we have been able to produce sterile stable ready-to-use stock-in-trade protein solutions with emetine hydrochloride which have great usefulness in non-specific therapy and especially in the parenteral treatment of peptic ulcer.

We refer in this connection to the paper published by one of us in the June 1931 issue of the American Journal of Surgery and called "A New Treatment of Peptic Ulcer" (a preliminary report by George P. Pitkin), where the physiological effects of and the cures made possible by the object of our invention have been described in detail.

Other ipecac alkaloids, such as the water-soluble salts of cephaeline, also other water-soluble salts of emetine, such as emetine lactate or emetine gluconate, may be used in place of emetine hydrochloride; and other protein solutions, such as fresh sterile milk or casein solution, may be used in place of bacteria- fat- and casein-free milk or Much's antigen. Non-specific proteins which, when administered parenterally, cause a severe general reaction on the part of the patient, such as chills, fever, rigor and vomiting, are intended to be excluded from the appended claims.

While we have described our improvements in great detail and with respect to preferred embodiments thereof, we do not desire to limit ourselves to such details or embodiments, since many modifications and changes may be made and the invention embodied in widely different forms without departing from the spirit or scope of the invention in its broadest aspects. Hence we desire to cover all modifications and forms coming within the scope or language of any one or more of the appended claims.

Much antigen, referred to inthe specification and the claims, is defined by Dr. William F. Petersen on page 36 of his book entitled "Protein Therapy and Non-Specific Resistance" (The MacMillan Company, New York, 1922) as follows:

"*Much's antigen.*—Much has recently described a vaccine which he terms 'Immunvollvaccine' for intramuscular injection, which he has used in the treatment of influenza. It is prepared from a number of non-specific antigens: (a) Reactive proteins, the metabolic products of several nonpathogenic bacteria, (b) a lipoid mixture from bile, and (c) a fat mixture of animal derivation. The theory underlying such a mixture is that of partial antigens which he has developed in tuberculosis."

This antigen is also described in "Deutsche Medizinische Wochenschrift", vol. 46, No. 29, page 791, July 1, 1920, by its author, Professor Hans Much.

What we claim is:

1. A reenforced, stable and sterile aqueous protein preparation, comprising an aqueous solution of a non-specific protein and a water-soluble salt of an ipecac alkaloid, said preparation being applicable in non-specific therapy and especially in the parenteral treatment of peptic ulcer.

2. A reenforced, stable and sterile aqueous protein preparation comprising an aqueous solution of a non-specific protein selected from the group consisting of bacteria- fat- and casein-free milk, fresh sterile milk, casein solution and Much's antigen solution, and a water-soluble salt of an ipecac alkaloid, said preparation being applicable in non-specific therapy and especially in the parenteral treatment of peptic ulcer.

3. A reenforced, stable and sterile aqueous protein preparation, comprising an aqueous solution of a non-specific protein and a water-soluble salt of emetine, said preparation being applicable in non-specific therapy and especially in the parenteral treatment of peptic ulcer.

4. A reenforced, stable and sterile aqueous protein preparation comprising an aqueous solution of a non-specific protein and a water-soluble salt of cephaeline, said preparation being applicable in non-specific therapy and especially in the parenteral treatment of peptic ulcer.

5. A reenforced, stable and sterile aqueous protein preparation, comprising an aqueous solution of a non-specific protein and emetine hydrochloride, said preparation being applicable in non-specific therapy and especially in the parenteral treatment of peptic ulcer.

6. A reenforced, stable and sterile aqueous protein preparation comprising Much's antigen solution and emetine hydrochloride, said preparation being applicable in non-specific therapy and especially in the parenteral treatment of peptic ulcer.

7. A reenforced, stable and sterile aqueous protein preparation, comprising bacteria- fat- and casein-free milk and emetine hydrochloride.

8. A reenforced, stable and sterile aqueous protein preparation comprising in a total amount of 100 cubic centimeters of aqueous solution about 33.5 cubic centimeters to about 65 cubic centimeters of Much's antigen solution and about 330 milligrams to about 1080 milligrams of emetine hydrochloride.

9. A reenforced, stable and aqueous sterile protein preparation comprising in 100 cubic centimeters of bacteria- fat- and casein-free milk about 100 milligrams to about 1300 milligrams of emetine hydrochloride.

10. A reenforced, stable and sterile aqueous protein preparation, comprising in 100 cubic centimeters total aqueous solution 67 cubic centimeters of Much's antigen solution and 1 gram of emetine hydrochloride.

11. A reenforced, stable and sterile aqueous protein preparation, comprising 100 cubic centimeters of bacteria- fat- and casein-free milk and 1.3 grams of emetine hydrochloride.

In testimony whereof, we affix our signatures.

GEORGE P. PITKIN.
CHARLES W. HOOPER.